(12) United States Patent
Poole

(10) Patent No.: US 11,931,812 B2
(45) Date of Patent: Mar. 19, 2024

(54) AUTO-ADJUSTABLE POCKET HOLE JIG DOCKING STATION

(71) Applicant: Robert N. Poole, Coronado, CA (US)

(72) Inventor: Robert N. Poole, Coronado, CA (US)

( * ) Notice: Subject to any disclaimer, the term of this patent is extended or adjusted under 35 U.S.C. 154(b) by 100 days.

(21) Appl. No.: 17/526,868

(22) Filed: Nov. 15, 2021

(65) Prior Publication Data

US 2022/0212271 A1 Jul. 7, 2022

Related U.S. Application Data

(60) Provisional application No. 63/114,143, filed on Nov. 16, 2020.

(51) Int. Cl.
*B23B 47/28* (2006.01)
*B23B 49/00* (2006.01)

(52) U.S. Cl.
CPC .......... *B23B 47/287* (2013.01); *B23B 49/005* (2013.01); *B23B 2247/10* (2013.01); *B23B 2260/0482* (2013.01)

(58) Field of Classification Search
CPC . B23B 47/287; B23B 49/005; B23B 2247/10; B23B 2260/0482
See application file for complete search history.

(56) References Cited

U.S. PATENT DOCUMENTS

| 8,840,345 B1 * | 9/2014 | Park | B23B 47/287 |
| | | | 408/112 |
| 10,022,808 B2 * | 7/2018 | Chang | B23B 47/287 |
| 10,144,068 B1 * | 12/2018 | Poole | B23B 47/287 |
| 10,376,967 B2 * | 8/2019 | Poole | B23B 47/287 |
| 2018/0290217 A1 * | 10/2018 | Asimakis | B23B 47/28 |
| 2019/0030619 A1 * | 1/2019 | Thackery | B23B 47/287 |
| 2019/0047058 A1 * | 2/2019 | Pikarski | B23B 49/005 |

FOREIGN PATENT DOCUMENTS

CN 209140351 U * 7/2019 .......... B23B 47/287

* cited by examiner

*Primary Examiner* — Eric A. Gates
(74) *Attorney, Agent, or Firm* — Parsons & Goltry; Robert A. Parsons; Michael W. Goltry

(57) ABSTRACT

An auto-adjusting pocket hole jig docking station including a housing and an adjustment mechanism. The adjustment mechanism carried by the housing and including a first rack and a second rack reciprocally movable between raised and lowered positions, relative the body. A double pinion gear is rotatably carried by the housing with a first gear in meshing engagement with the first rack and a second gear in meshing engagement with the second rack. The first gear and the second gear having a rotational ratio therebetween wherein movement of one of the first rack and the second rack moves the other of the first rack and the second rack a distance proportional to the rotational ratio.

10 Claims, 15 Drawing Sheets

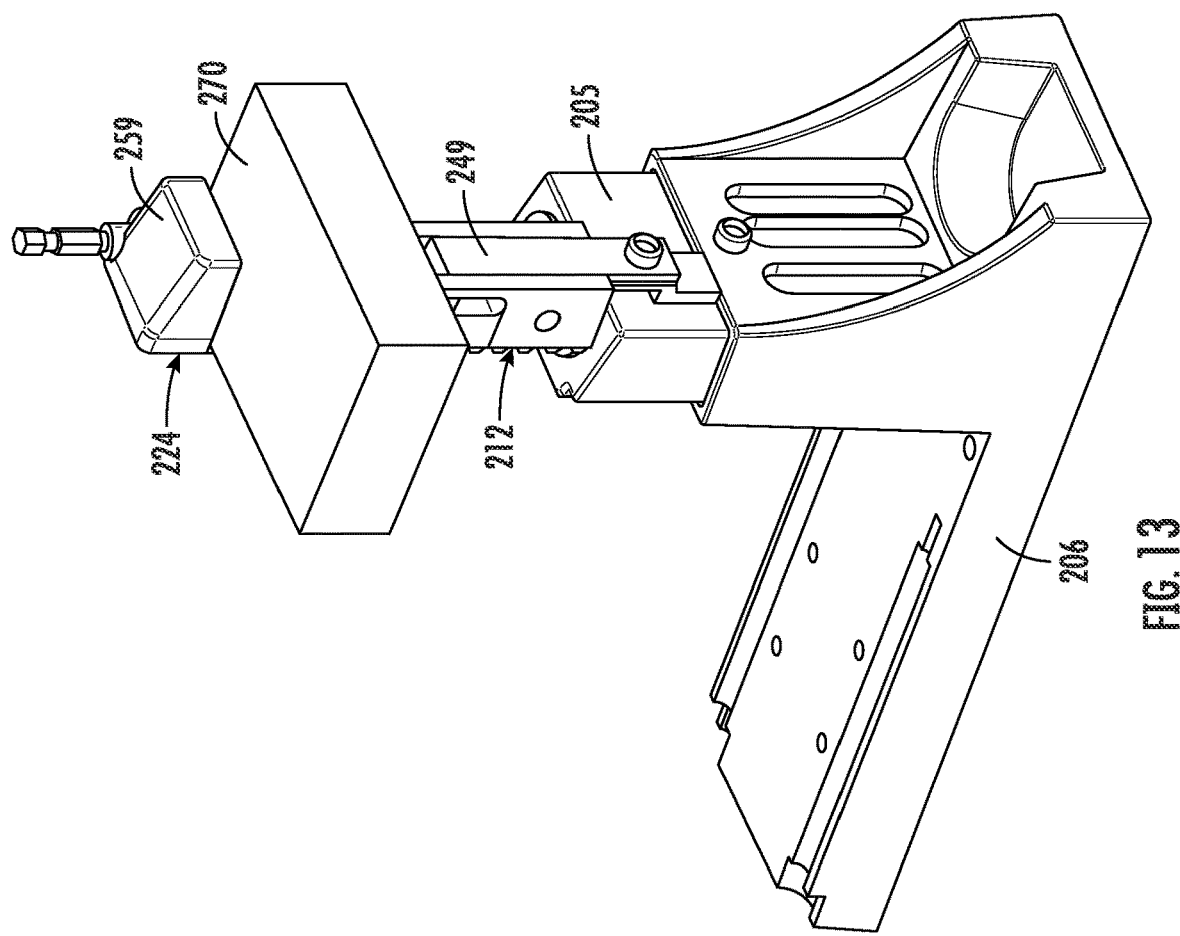
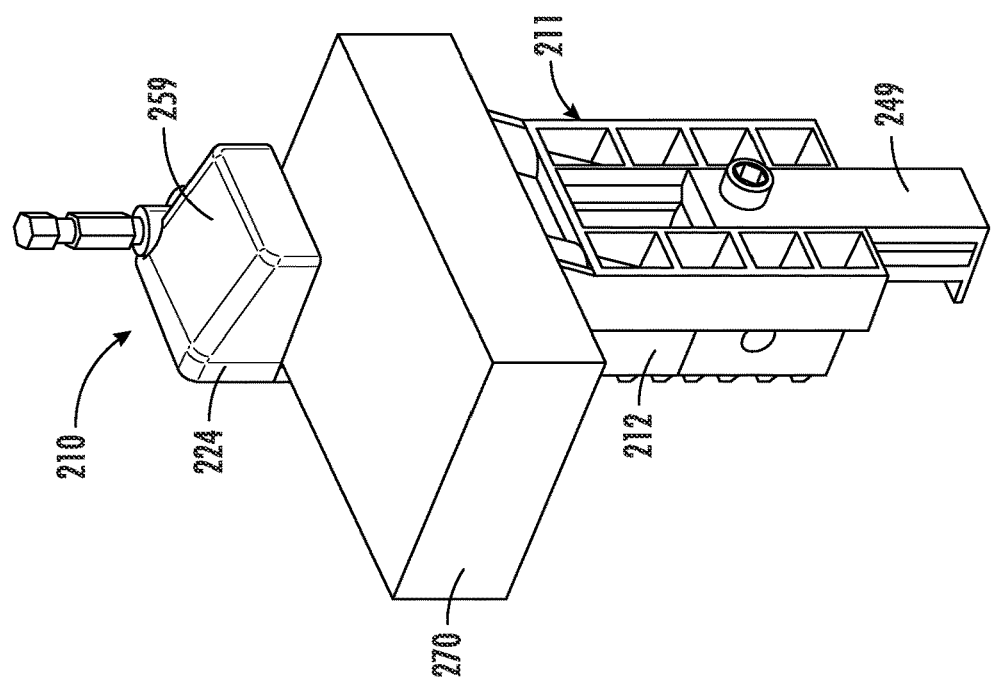

AUTO-ADJUSTABLE POCKET HOLE JIG DOCKING STATION

CROSS-REFERENCE TO RELATED APPLICATION

This application claims the benefit of U.S. Provisional Patent Application No. 63/114,143, filed 16 Nov. 2020.

FIELD OF THE INVENTION

This invention relates to pocket hole jig tools, and more specifically to pocket hole jig tools that are adjustable.

BACKGROUND OF THE INVENTION

Pocket hole joinery is used extensively in woodworking as a quick and easy way to join two wood workpieces. A pocket hole is a pilot hole drilled at an angle in a first wood workpiece to align a screw for fastening to a second workpiece. A step drill creates a counterbored hole, or pocket, for the head of the pocket screw and a smaller diameter for body clearance. The counterbore or pocket of the pocket holes receive the pocket hole screw heads, hiding them in the internal, underside construction areas of woodworking projects.

It is important for the pocket hole to be drilled to the correct height in a workpiece. If the height is too small, the screw will stick through the surface of the joined part. If the height is too big, the joint will not be as strong as it should be. The correct pocket height will be different for different thickness of wood and different screw lengths.

Currently, various jigs have been provided for assisting in the drilling of pocket holes. However, precision and correctly measuring placement of the hole in a workpiece is important. Current jigs are useful in correctly forming holes in a workpiece, but they require extensive measurements during positioning of a workpiece or extensive trial and error to find the correct placement. These devices are often cumbersome and difficult to use.

It would be highly advantageous, therefore, to remedy this and other deficiencies inherent in the prior art.

Accordingly, it is an object of the present invention to provide new and improved pocket hole jig which is adjustable automatically.

It is another object of the present invention to provide new and improved pocket hole jig which can be used as a hand held stand-alone device or used in combination with a base.

SUMMARY OF THE INVENTION

Briefly to achieve the desired objects and advantages of the instant invention, provided is an auto-adjusting pocket hole jig docking station. The docking station includes a housing and an adjustment mechanism carried by the housing. The adjustment mechanism includes a first rack reciprocally movable between a raised position and a lowered position, relative the body, and a second rack reciprocally movable between a raised position and a lowered position, relative the body. A double pinion gear is rotatably carried by the housing. The double pinion gear includes a first gear in meshing engagement with the first rack and a second gear in meshing engagement with the second rack. The first gear and the second gear of the double pinion gear having a rotational ratio therebetween determining the relative movement of the first and second racks, wherein movement of one of the first rack and the second rack moves the other of the first rack and the second rack a distance proportional to the rotational ratio.

BRIEF DESCRIPTION OF THE DRAWINGS

Specific objects and advantages of the instant invention will become readily apparent to those skilled in the art from the following detailed description of a preferred embodiment thereof taken in conjunction with the drawings, in which:

FIG. 12 is a perspective view of the auto-adjusting pocket hole jig docking station with accompanying removable drill guide pocket hole jig, gauging a workpiece;

FIG. 13 is a perspective view of the auto-adjusting pocket hole jig docking station gauging a workpiece, as it would appear being received by a conventional pocket hole jig;

DETAILED DESCRIPTION OF THE PREFERRED EMBODIMENT

Figure 1:
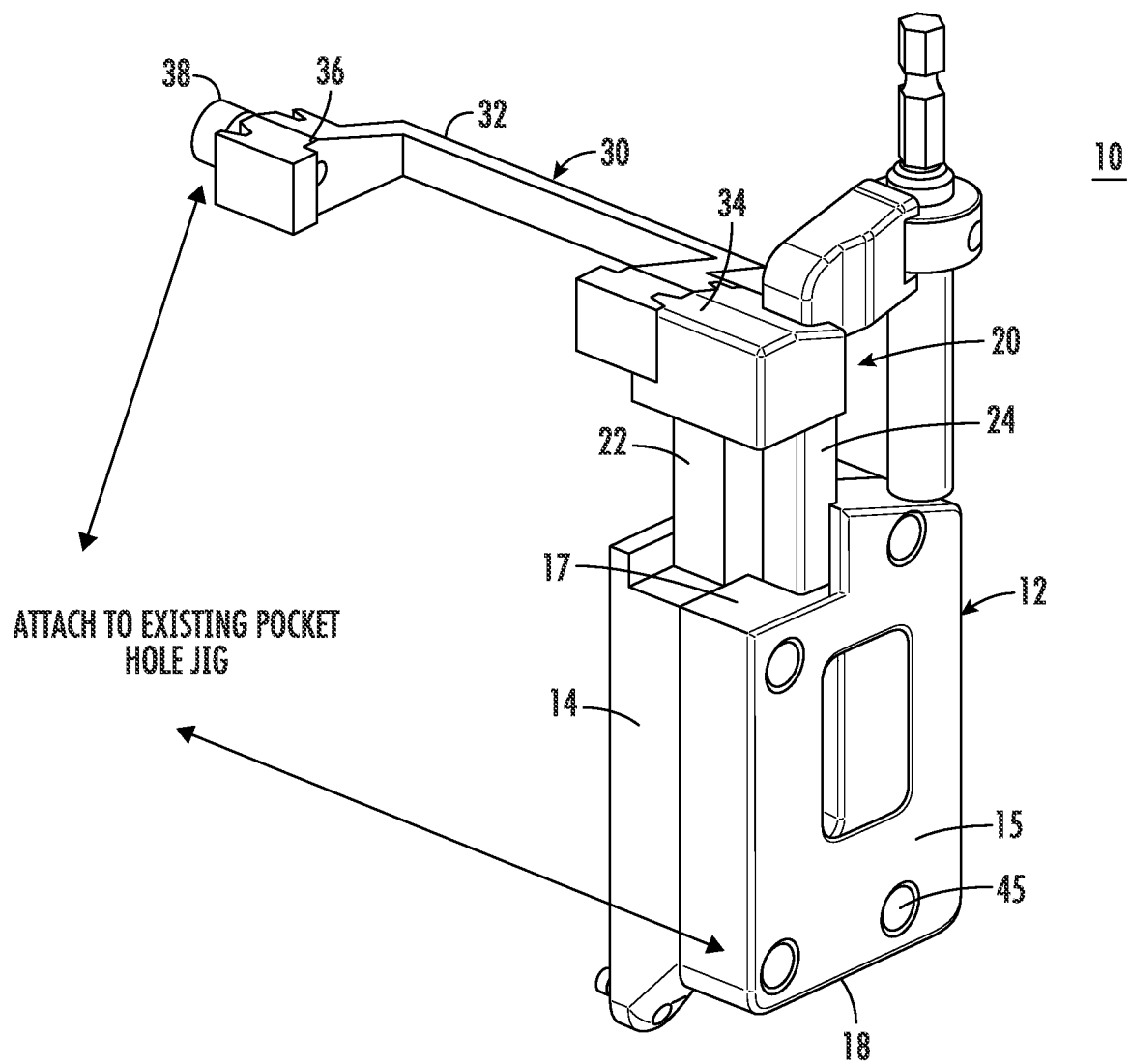
FIG. 1 is a perspective view of an auto-adjusting pocket hole jig docking station, in accordance with the present invention.

Turning now to the drawings in which like reference characters indicate corresponding elements throughout the several views, attention is first directed to FIG. 1 which illustrates an auto-adjusting pocket hole jig docking station, generally designated 10, in accordance with the present invention. Docking station 10 includes a housing 12 having a housing body 14, a cover portion 15, a top end 17 and a bottom end 18. An adjustment mechanism 20 is reciprocally carried by housing 12 and includes a guide block gear rack 22 and a plunger gear rack 24. Further details of adjustment mechanism 20 will be described in the following embodiment. An attachment fixture 30 is carried by an upper end of guide block gear rack 22. Attachment fixture 30, in this preferred embodiment includes a bracket 32 having an end 34 attached to the upper end of guide block gear rack 22 and an opposing end 36 carrying a set screw 38.

Figure 2:
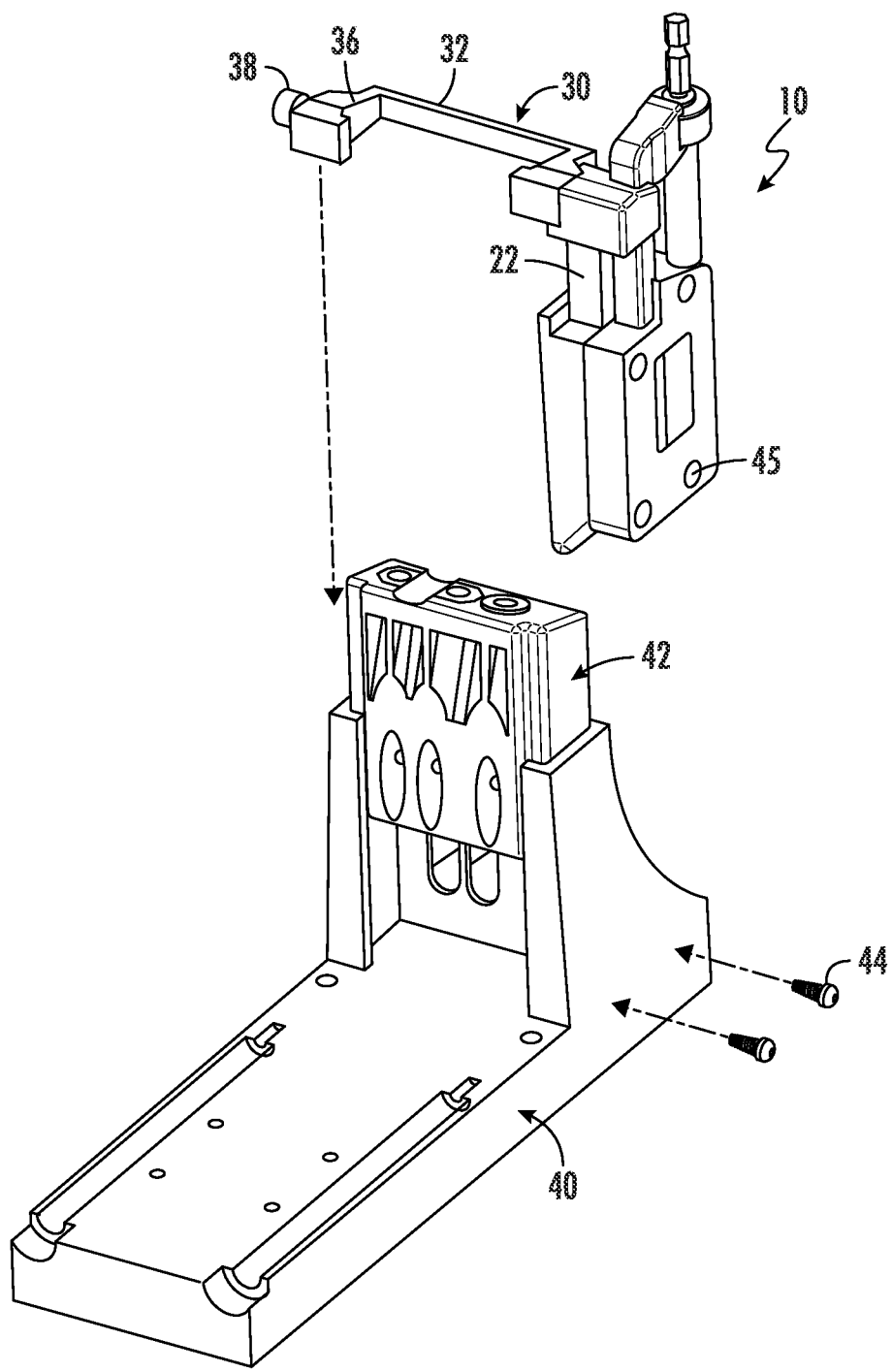
FIG. 2 is a perspective view of the auto-adjusting pocket hole jig docking station of FIG. 1, as it would appear being received by a guide block and base of a conventional pocket hole jig.

With additional reference to FIG. 2, docking station 10 is illustrated being received by a conventional pocket hole jig base 40 and guide block 42. Housing 12 is attached to the side of base 40 using fasteners such as screws 44 passing through apertures 45 formed therein and being received by base 40. A top end of guide block 42 is engaged by bracket 32. Tightening of set screw 38 fixedly attaches bracket 32 to guide block 42, capturing guide block 42 between end 34 and end 36. When installed, housing 12 of docking station 10 is removably fixedly attached to base 40 and bracket 32 is removably fixedly attached to guide block 42. As will be described presently, this arrangement permits guide block gear rack 22 to reciprocally move vertically with a corresponding movement of guide block 42, while housing 12 remains fixed an immovable with respect to base 40. Thus, a docking station is taught which can be attached to an existing pocket hole jig guide block 42 and base 40.

Figure 3:
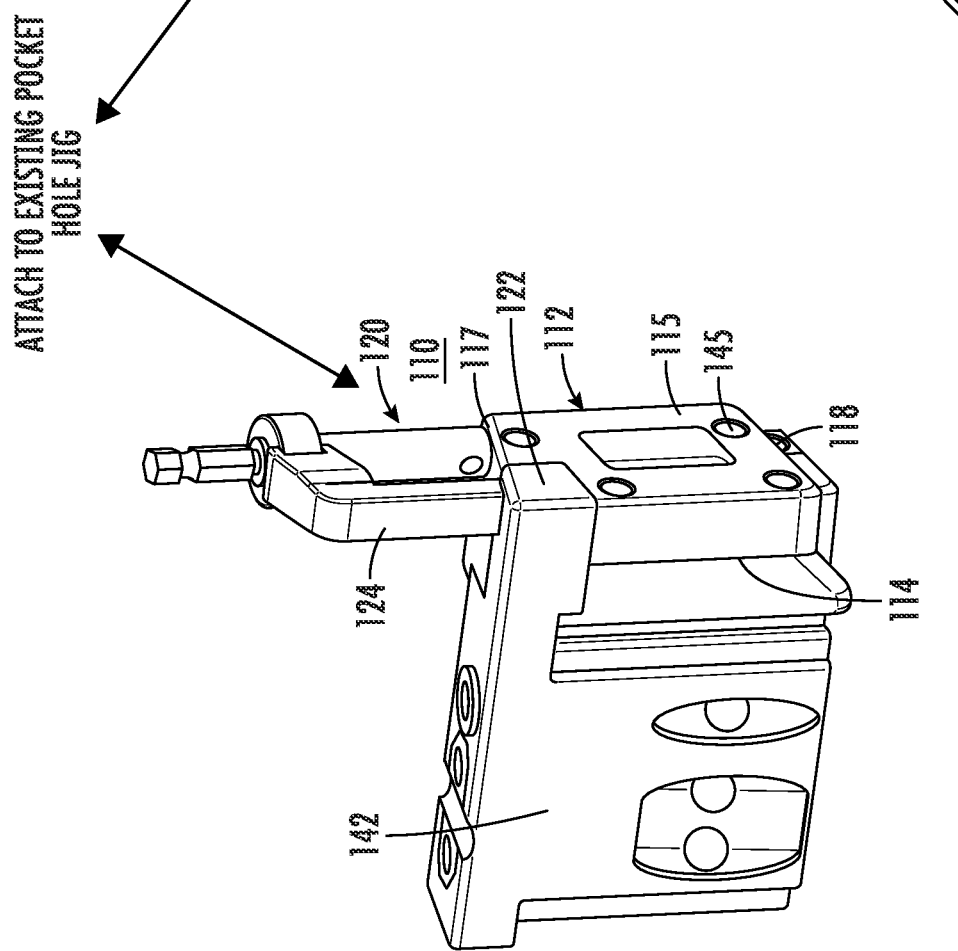
FIG. 3 is a perspective view of an auto-adjusting pocket hole jig docking station with a fixed guide block, in accordance with the present invention.

Referring now to FIG. 3, another embodiment of an auto-adjusting pocket hole jig docking station, generally designated 110, is illustrated. Docking station 110 is substantially the same as docking station 10 with the difference being that a replacement guide block is provided integrally coupled to docking station 110. Docking station 110 includes a housing 112 having a housing body 114, a cover portion 115, a top end 117 and a bottom end 118. An adjustment mechanism 120 is reciprocally carried by housing 112 and includes a guide block gear rack 122 and a plunger gear rack 124. Guide block gear rack 122 is integrally formed along a side of a replacement guide block 142 (FIG. 5).

Figure 4:
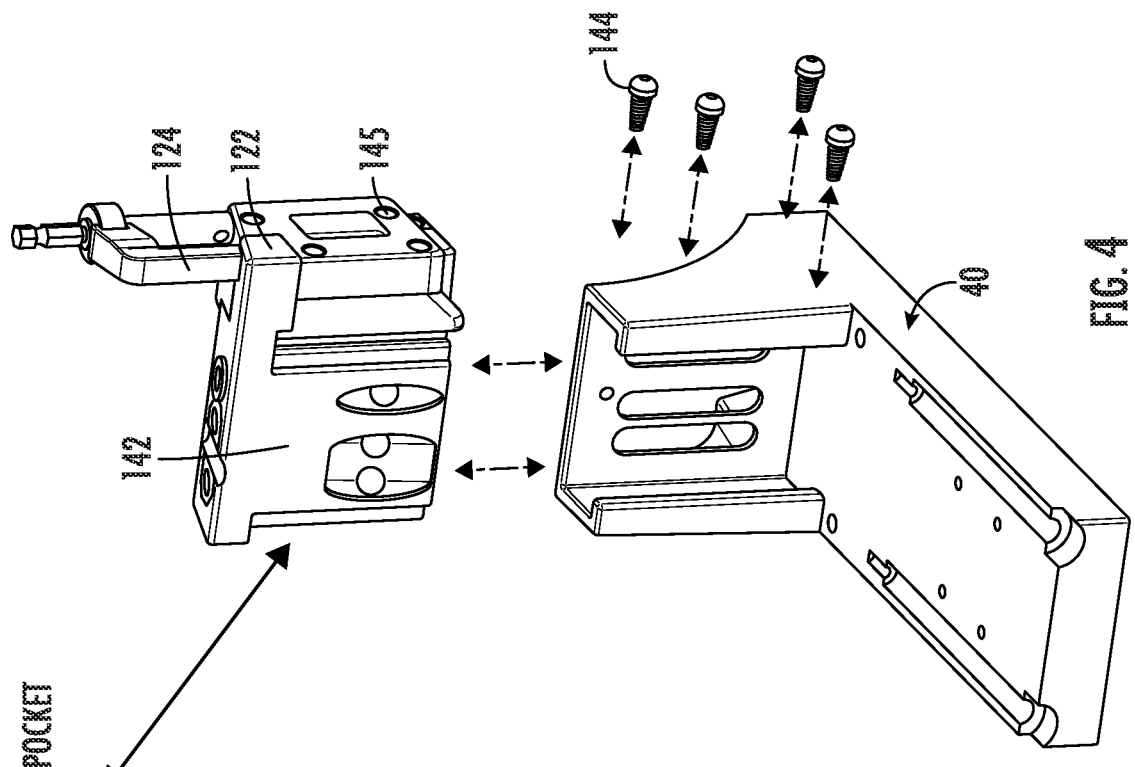
FIG. 4 is a perspective view of the auto-adjusting pocket hole jig docking station of FIG. 3, as it would appear being received by the base of a conventional pocket hole jig.

With additional reference to FIG. 4, docking station 110 is illustrated being received by a conventional pocket hole jig base 40. Housing 112 is attached to the side of base 40 using fasteners such as screws 144 passing through apertures 145 formed therein and being received by base 140. When installed, housing 112 of docking station 110 is removably fixedly attached to base 40 and guide block 142 is received by base 40. Guide block 142 and integrally formed guide block gear rack 122 are reciprocally movable vertically with respect to base 40 while housing 112 remains fixed an immovable with respect to base 40. Thus, a docking station is taught which can be attached to an existing pocket hole jig base 40.

Figure 5:
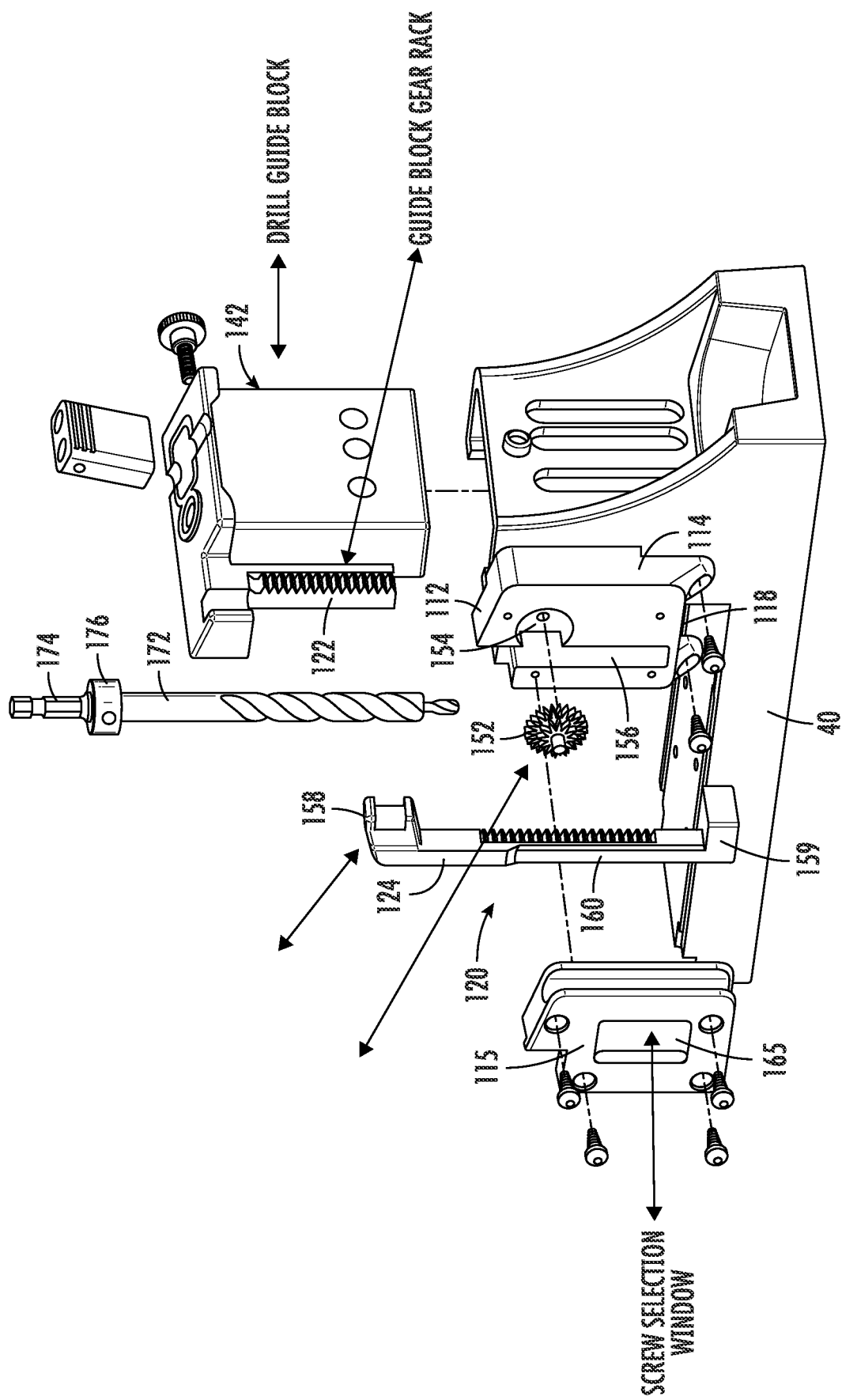
FIG. 5 is an exploded view of the auto-adjusting pocket hole jig docking station of FIG. 4, as it would appear being received by the base of a conventional pocket hole jig

Turning now to FIG. 5, an exploded view of docking station 110 coupled to base 40 is illustrated. Adjustment mechanism 120 in the preferred embodiment includes a rack and pinion system carried by housing 12. Double pinion gear 152 (circular gear), includes an inner gear and an outer gear having a desired rotational ratio therebetween. Double pinion gear 152 is rotatably carried within housing 112 in a void 154 defined by housing body 114. Housing body 114 includes a vertical channel 156 extending from top end 117 to bottom end 118 adjacent forming a tangent to, and in communication with void 154. Guide block gear rack 122 and plunger gear rack 124 (linear gears) extend through vertical channel 156 adjacent to and in meshing engagement with double pinion gear 152. Guide block gear rack 122 engages the inner gear of double pinion gear 152 for reciprocal movement of guide block 142, and plunger gear rack 124 engages the outer gear of double pinion gear 152 for reciprocal movement of plunger gear rack 124 between a raised position and a lowered position. Plunger gear rack 124 terminates at an upper end in a collar receiver 158, terminates at a lower end with a contact foot 159, and includes screw size indication indicia 160 carried therebetween. A window 165 is formed in cover portion 115 through which the screw size indication indicia 160 can be seen.

Figure 6:
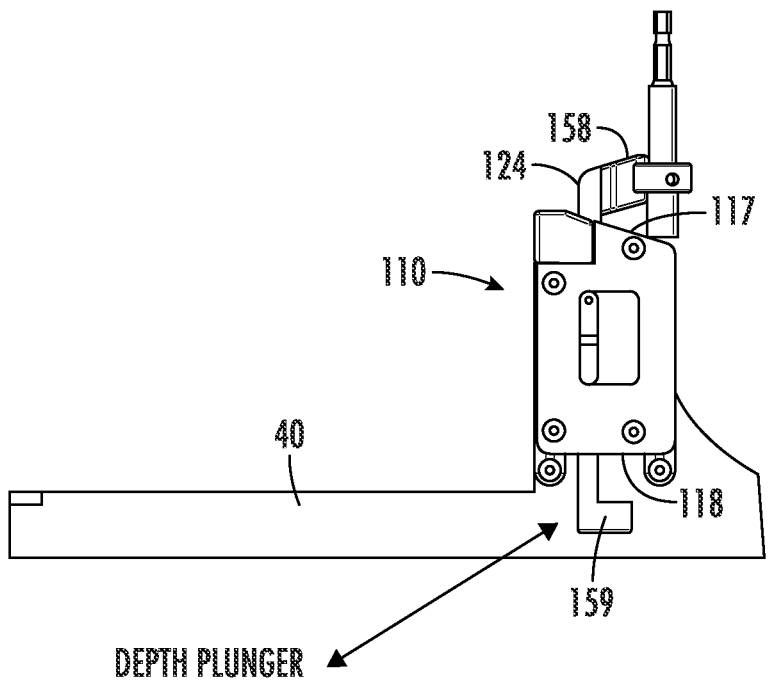
FIG. 6 is a side view of the auto-adjusting pocket hole jig docking station of FIG. 4 with the plunger gear rack in the lowered position.
Figure 7:
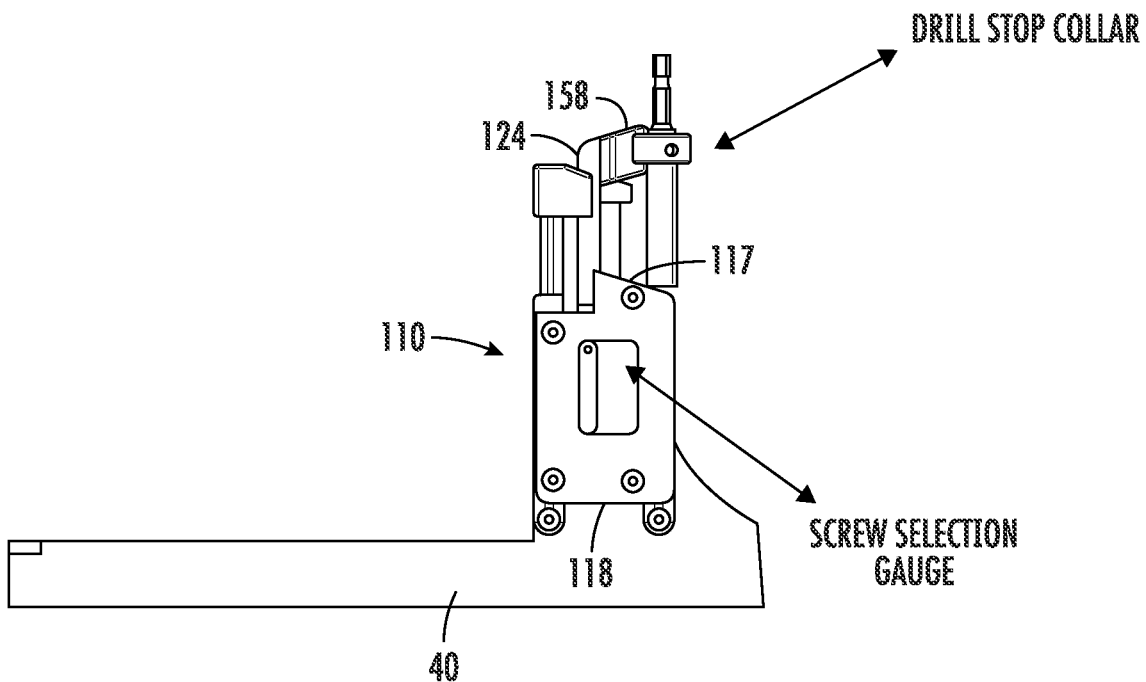
FIG. 7 is a side view of the auto-adjusting pocket hole jig docking station of FIG. 4 with the plunger gear rack in the raised position.
Figure 8:
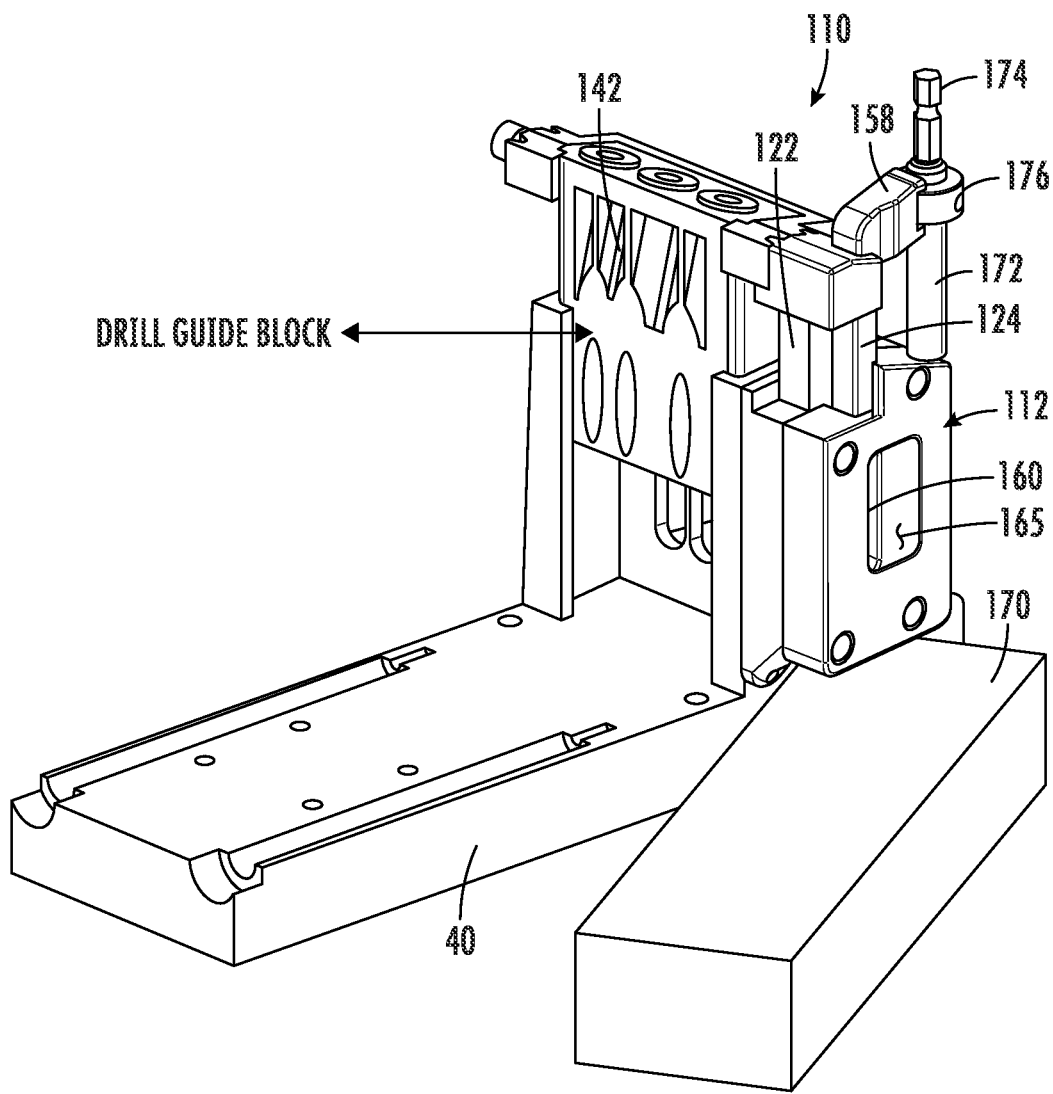
FIG. 8 is a perspective view of the auto-adjusting pocket hole jig docking station of FIG. 4 with the plunger gear rack gauging a workpiece.

With additional reference to FIGS. 6-8, FIG. 6 illustrates plunger gear rack 124 in a lowered position, with contact foot 159 visible below bottom end 118 and positioned above a supporting surface. FIG. 7 illustrates plunger gear rack 124 in a raised position, with contact foot 159 positioned within bottom end 118. Movement of plunger gear rack 124 between the raised and lowered positions rotates double pinion gear 152 by rotating the outer gear with which it meshes. Rotation of the outer gear correspondingly rotates the inner gear with which guide block gear rack 122 meshes. Rotation of the inner gear moves guide block 142 upwardly or downwardly within pocket hole jig base 40 in a relative relation to movement of plunger gear rack 124 due to the ratio between the inner and outer gears of double pinion gear 152. Referring specifically to FIG. 8, operation of auto-adjusting pocket hole jig docking station 110 is illustrated in use with a workpiece 170. Workpiece 170 is positioned on the worksurface adjacent base 40 underlying contact foot 159 of plunger gear rack 124. Plunger gear rack 124 is moved downwardly until contact foot 159 contacts the surface of workpiece 170. The downward movement of plunger gear rack 124 results in the movement of guide block 142 to a position appropriate to the pocket forming process with regard to the thickness of that particular workpiece 170. With plunger gear rack 124 positioned and secured, workpiece 170 can be removed and placed on base 40 for drilling. The position of plunger gear rack 124 auto-adjusts guide block 142 to the position required to form pocket holes in work piece 170.

The movement of plunger gear rack 124 also adjusts the position of collar receiver 158 relative housing 112. A drill bit 172 carried in a vertical slot formed in housing 112 has a base end 174 extending upwardly through collar receiver 158. Collar receiver 158 carries a stop collar 176 therein through which base end 174 of drill bit 172 extends. As plunger gear rack 124 is moved upwardly or downwardly relative housing 112, collar receiver 158 moves stop collar 176 upwardly or downwardly on drill bit 172, positioning stop collar 176 appropriately for drilling pocket holes in workpiece 170 the required depth for the thickness of the workpiece used. Additionally, once the workpiece has been used to position plunger gear rack 124, the screw size indication indicia 160 visible through window 165 indicates the screw size to be employed with the workpiece used.

Figure 10:
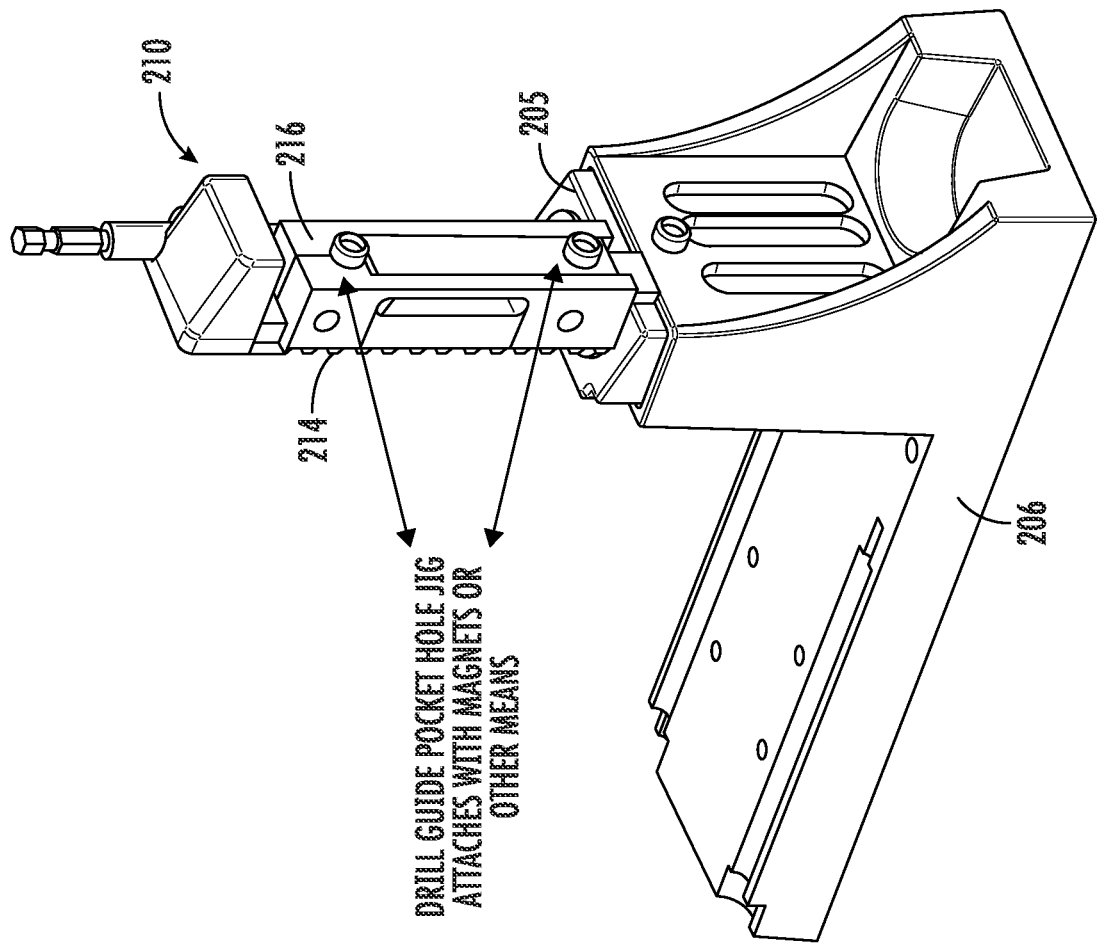
FIG. 10 is a perspective view of the auto-adjusting pocket hole jig docking station as it would appear being received by a conventional pocket hole jig.
Figure 9:
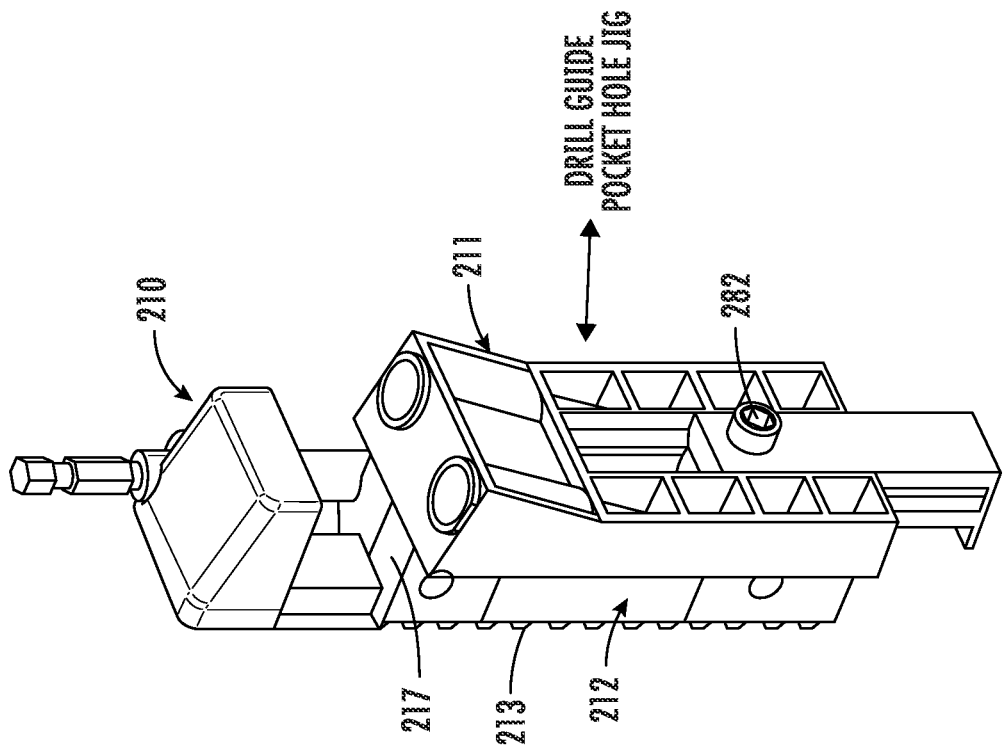
FIG. 9 is a perspective view of an auto-adjusting pocket hole jig docking station with accompanying removable drill guide pocket hole jig, according to the present invention.

Referring now to FIGS. 9 and 10, another embodiment of an auto-adjusting pocket hole jig docking station, generally designated 210, is illustrated. Docking station 210 is intended to be a handheld calibration unit used on a conventional pocket hole jig unit, or used with a removable drill guide pocket hole jig 211 as will be described presently. Removable drill guide pocket hole jig 211 and auto-adjusting pocket hole jig docking station 210 are removably coupled by an attachment fixture. When auto-adjusting pocket hole jig docking station 210 is used with a conventional pocket hole jig 202 (FIG. 10), drill guide pocket hole jig 211, is removed from auto-adjusting pocket hole jig docking station 210 and auto-adjusting pocket hole jig docking station 210 is positioned on a conventional guide block 205 carried by conventional base 206.

Figure 11:
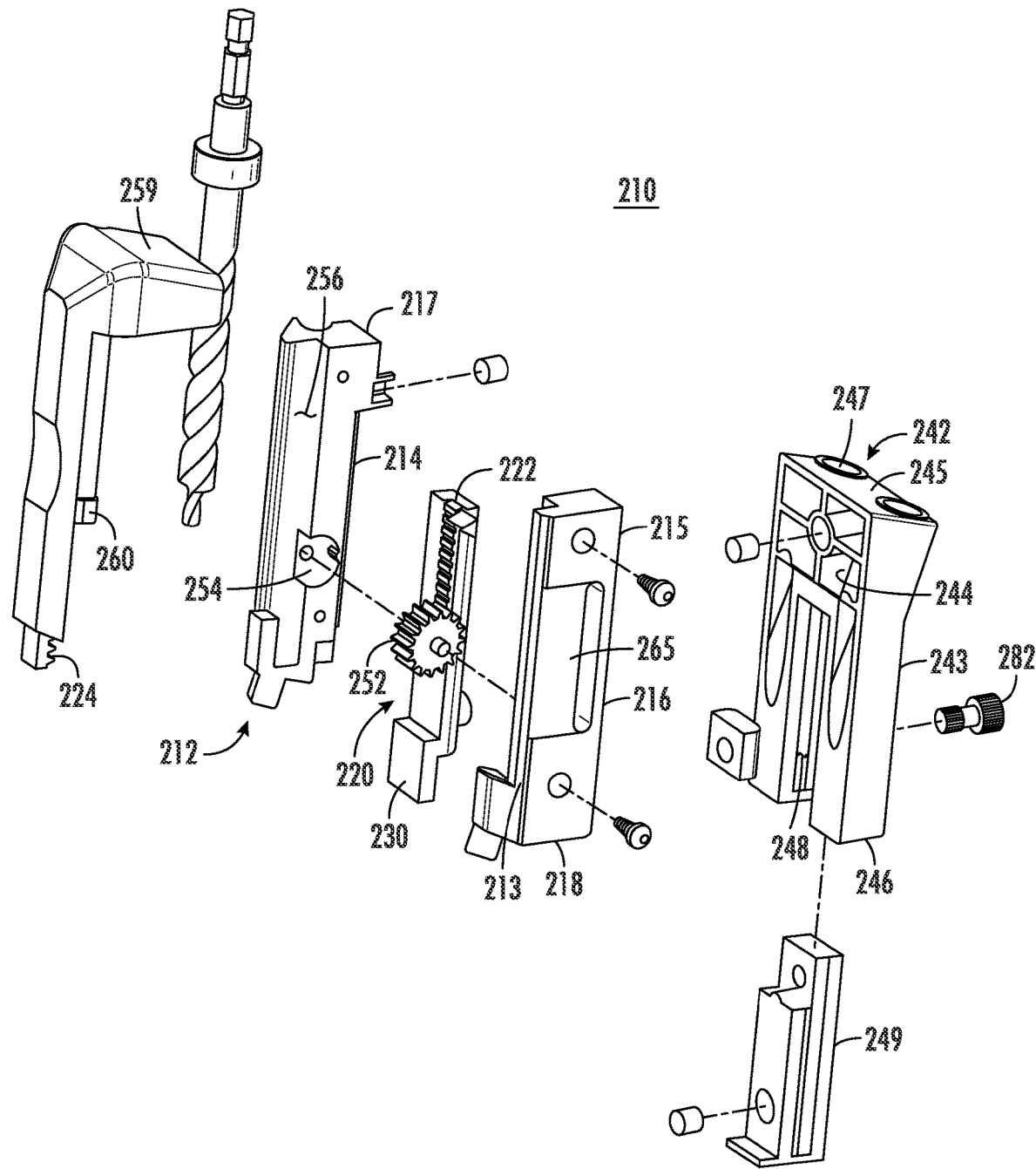
FIG. 11 is an exploded view of an auto-adjusting pocket hole jig docking station with accompanying removable drill guide pocket hole jig, according to the present invention.

With additional reference to FIG. 11, auto-adjusting pocket hole jig docking station 210 includes a housing 212 having a housing body 214, a cover portion 215, a top end 217 a bottom end 218, a back 213 and a front 216. An adjustment mechanism 220 is reciprocally carried by housing 112 and includes a guide block gear rack 222 and a plunger gear rack 224. Adjustment mechanism 220 in this preferred embodiment includes a rack and pinion system carried by housing 212. Double pinion gear 252 (circular gear), includes an inner gear and an outer gear having a desired rotational ratio therebetween. Double pinion gear 252 is rotatably carried within housing 212 in a void 254 defined by housing body 214. Housing body 214 includes a vertical channel 256 extending from top end 217 to proximate bottom end 218 forming a tangent to, and in communication with void 254. Plunger gear rack 224 (linear gear) extend through vertical channel 256 adjacent to and in meshing engagement with an outer gear of double pinion gear 252 at a side thereof toward back 213 of housing 212. Guide block gear rack 222 is positioned between housing body 214 and cover portion 215 and in meshing engagement with an inner gear of double pinion gear 252 at a side thereof toward front 216 of housing 212. Guide block gear rack 222 has a depth stop end 230 that extends downwardly below bottom end 218 of housing 212, and plunger gear rack 224 extends upwardly above top end 217 of housing 212. Plunger gear rack 224 terminates at an upper end in a contact foot 259 with a collar receiver 258 formed therein. Plunger gear rack 224 also includes screw size indication element 260 carried below contact foot 259. A window 265 is formed in cover portion 215 through which the screw size indication element 260 can be seen.

Still referring to FIGS. 9 and 11, drill guide pocket hole jig 211 includes a guide block 242 having a front surface 243, a back surface 244, a top end 245 and a bottom end 246. Guide channels 247, for receiving a drill bit therethrough, are formed in guide block 242 extending from the top end 245 to bottom end 246. A slot 248 is formed in bottom end 246 extending toward top end 245 and slidably receiving a depth stop member 249. Depth stop member 249 is movable between a retracted position and an extended position. Drill guide pocket hole jig 211 is removably coupled to housing 212 by an attachment fixture including coupling elements extending between housing 212 and guide block 242, and between housing 212 and depth stop member 249. In this preferred embodiment, the preferred coupling elements include magnets carried by housing 212 on guide block gear rack 222 and housing body 214, and complemental magnets carried by guide block 241 and depth stop member 249.

With additional reference to FIG. 12, plunger gear rack 224 is illustrated with a workpiece 270 captured between contact foot 259 and top end 217 of housing 212. Movement of plunger gear rack 124 between a raised position and a lowered position to capture workpiece 270 rotates double pinion gear 252 by rotating the outer gear with which it meshes. Rotation of the outer gear correspondingly rotates the inner gear with which guide block gear rack 222 meshes. When plunger gear rack 224 is moved upwardly, guide block gear rack 222 is moved downwardly a distance determined by the gear ratio between the inner and outer gears of double pinion gear 252, and vice versa. Thus, as plunger gear rack 224 is moved upwardly (or downwardly) to capture a workpiece thickness, guide block gear rack 222 is moved downwardly (or upwardly) a distance corresponding to the placement of a guide block in relation to the workpiece so as to properly position the guide block relative the workpiece.

In one instance as can be seen in FIGS. 13, removable drill guide pocket hole jig 211 has been removed, with auto-adjusting pocket hole jig docking station 210 coupled to conventional guide block 205 carried by pocket hole jig base 206. It should be understood that auto-adjusting pocket hole jig docking station 210 can be used on a conventional pocket hole jig either with or without removable drill guide pocket hole jig 211.

Figure 15:
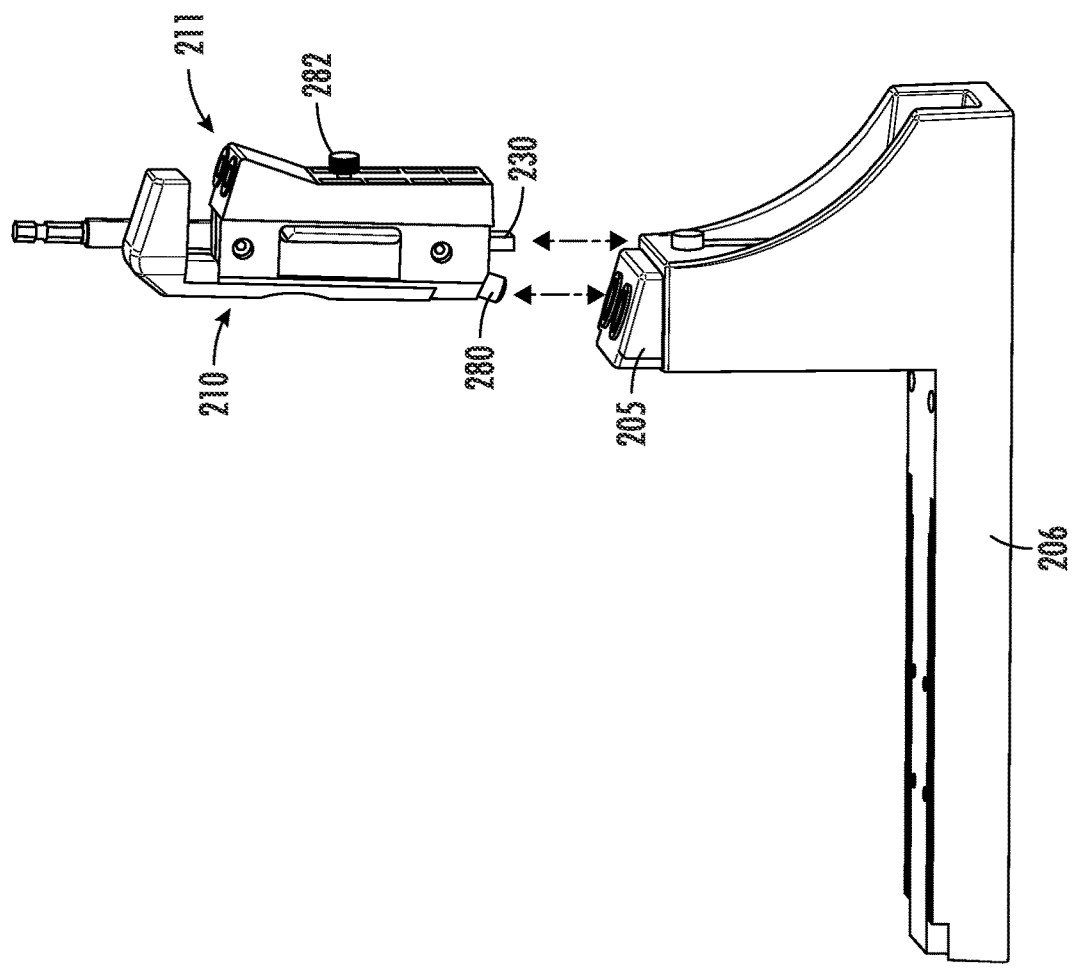
FIG. 15 is a side view of the auto-adjusting pocket hole jig docking station as it would appear being received by a conventional pocket hole jig.
Figure 14:
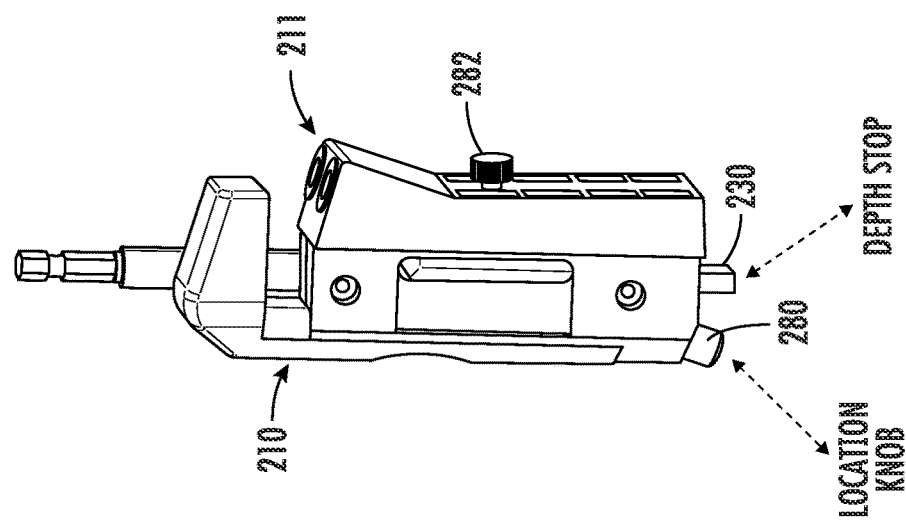
FIG. 14 is a side view of the auto-adjusting pocket hole jig docking station with accompanying removable drill guide pocket hole jig.

With additional reference to FIGS. 14 and 15, auto-adjusting pocket hole jig docking station 210 includes a location nub 280 formed in bottom end 218 spaced from depth stop end 230. Referring specifically to FIG. 15, nub 280 is received within the top of a drill guide channel of a conventional guide block 205 and depth stop end 230 engages the top of base 206 adjacent guide block 205. The length depth stop end 230 depends downward from bottom end 218 of housing 212 determines the height of guide block 205 within base 206. The further plunger gear rack 224 is moved upwardly due to thicker workpieces, the further guide block gear rack 222 is moved downwardly and the further guide block 205 is moved upwardly to accommodate the measured workpiece. FIG. 13 illustrates auto-adjusting pocket hole jig docking station 210 engaging a conventional pocket hole jig to adjust the height of guide block 205 with removable drill guide pocket hole jig 211 removed. FIG. 15 illustrates auto-adjusting pocket hole jig docking station 210 engaging a conventional pocket hole jig to adjust the height of guide block 205 with removable drill guide pocket hole jig 211 attached.

Figure 16:
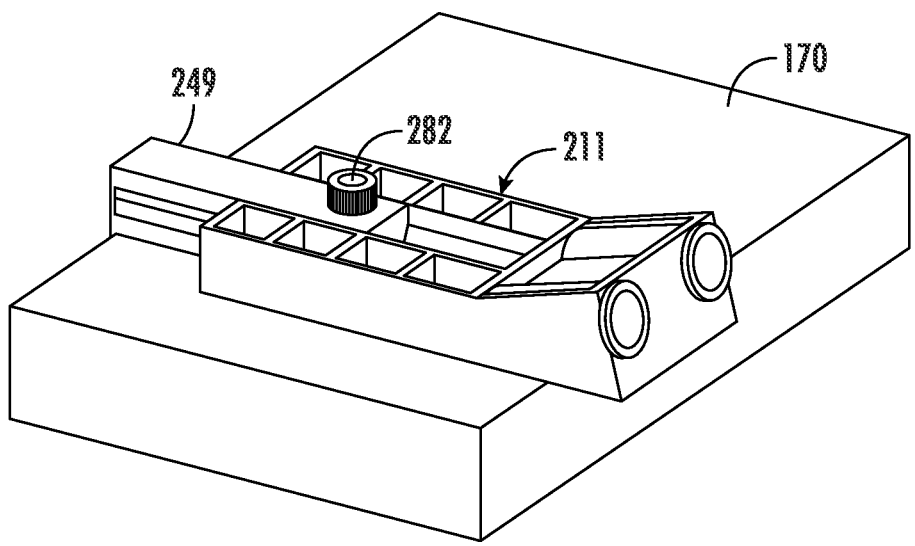
FIG. 16 is a perspective view of the removable drill guide pocket hole jig positioned on a workpiece.

Referring back to FIGS. 9 and 11, when removable drill guide pocket hole jig 211 is attached to auto-adjusting pocket hole jig docking station 210, movement of guide block gear rack 222 concurrently moves depth stop member 249 to which it is removably attached. Once a work piece is measured with auto-adjusting pocket hole jig docking station 210 and depth stop member 249 is moved to the specified position, it can be locked in place by fastening members 282. Once adjusted using auto-adjusting pocket hole jig docking station 210 (FIG. 12), removable drill guide pocket hole jig 211 is removed therefrom and positioned on workpiece 270 as shown in FIG. 16. Depth stop member 249 engages an edge of workpiece 270 providing the appropriate distance between the edge and drill bit guide channels 247 for forming properly positioned pocket holes.

Figure 17:
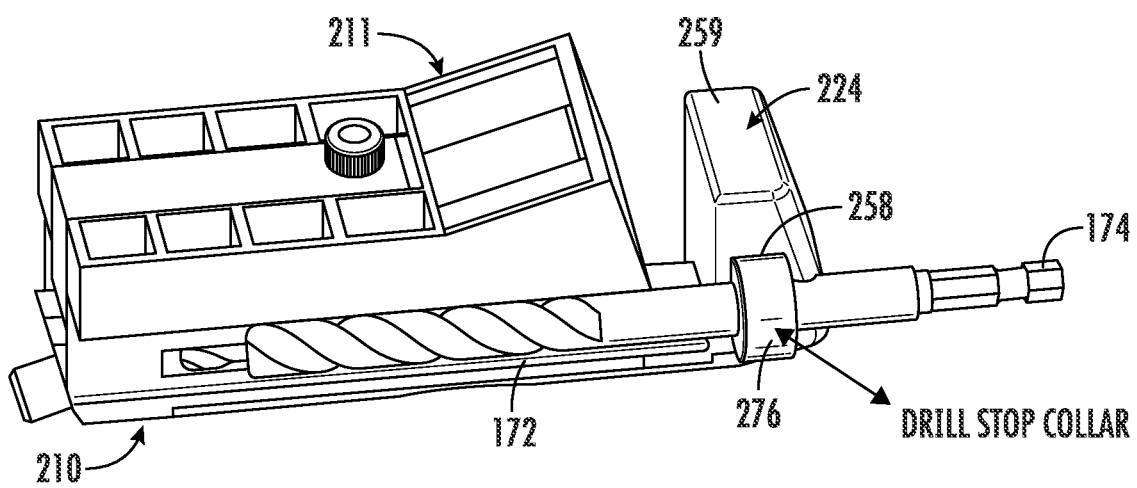
FIG. 17 is a perspective view of the auto-adjusting pocket hole jig docking station illustrating the drill bit stop collar positioning system according to the present invention.

Referring to FIG. 17, a drill stop collar positioning system is also included with auto-adjusting pocket hole jig docking station 210. Collar receiver 258 carries a stop collar 276 therein through which a base end 274 of drill bit 272 extends. As plunger gear rack 224 is moved upwardly or downwardly relative housing 212, collar receiver 258 moves stop collar 276 upwardly or downwardly on drill bit 272, positioning stop collar 276 appropriately for drilling pocket holes in workpiece 270 the required depth for the thickness of the workpiece used.

Figure 18:
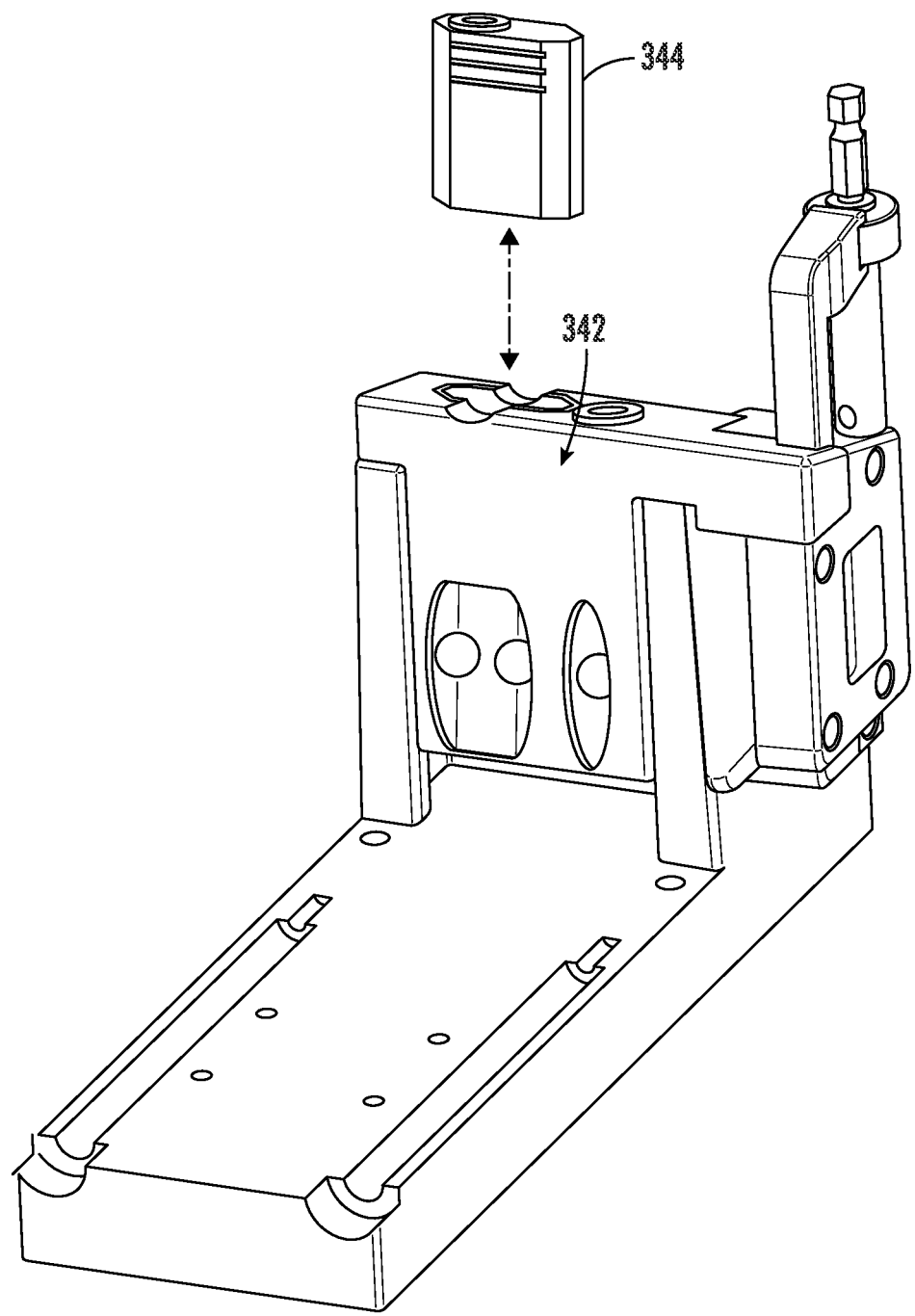
FIG. 18 is a perspective view of a reversible channel element receivable by a guide block, according to the present invention.
Figure 19:
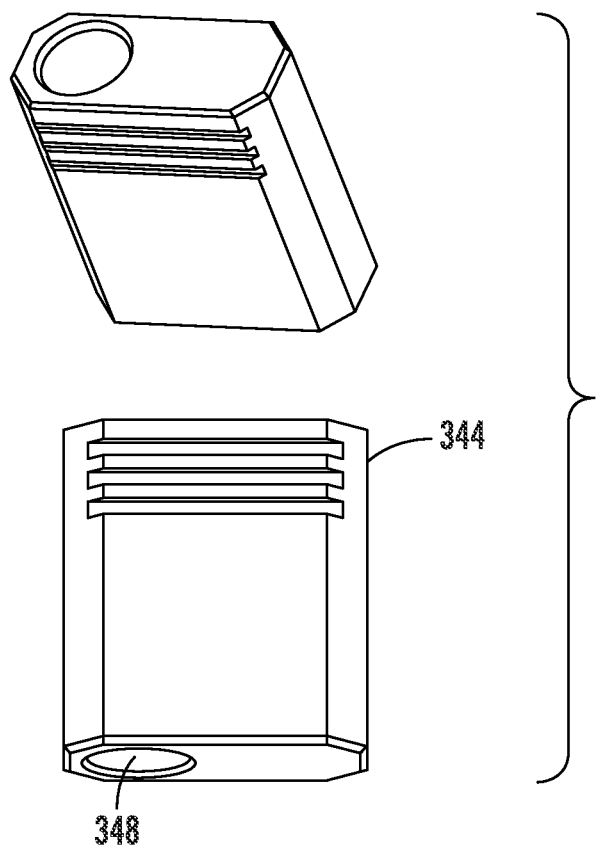
FIG. 19 is a top view of the reversible channel block of FIG. 18.
Figure 20:
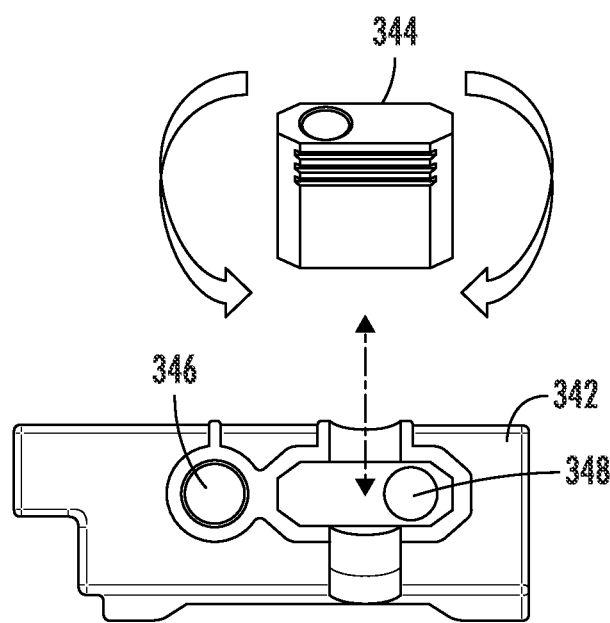
FIG. 20 is top view of a guide block receiving a reversible channel block.
Figure 21:
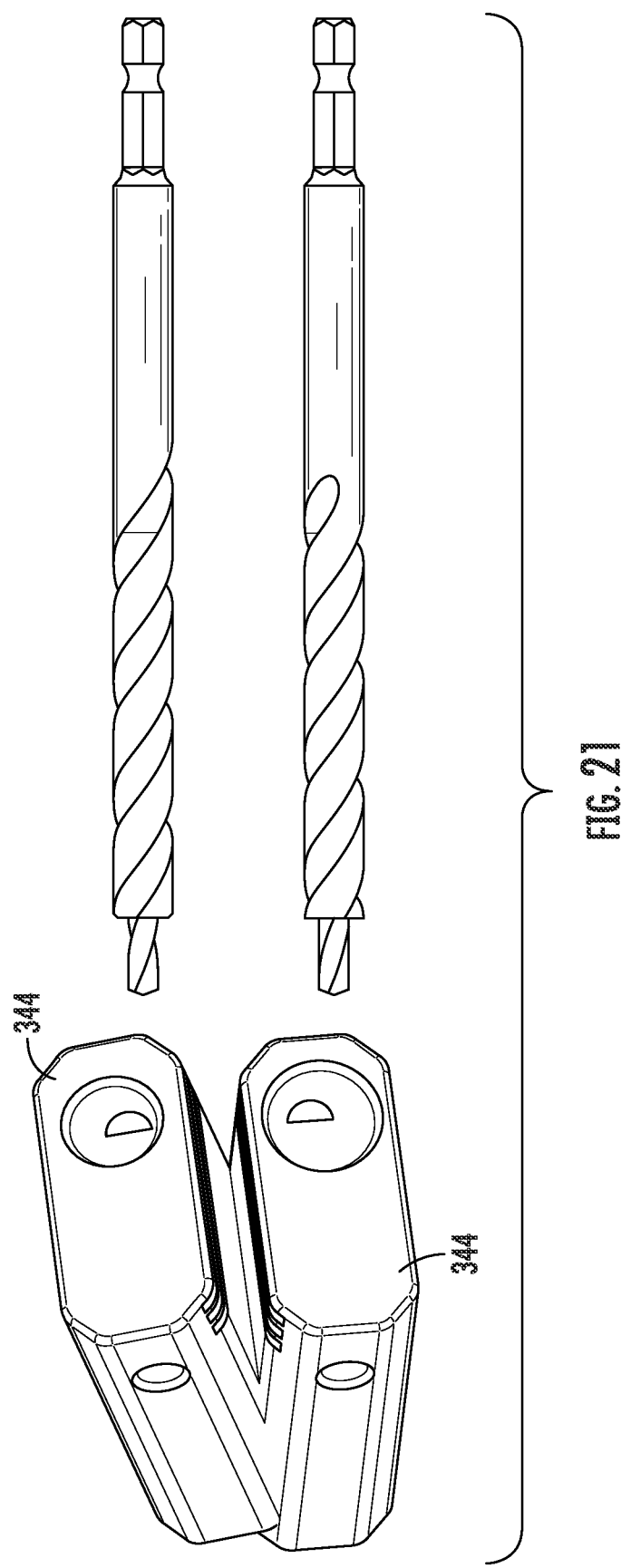
FIG. 21 is a perspective view of a reversible channel block having a small channel with associated drill bit, and a perspective view of a reversible channel block having a large channel with associated drill bit.

Turning now to FIG. 18, each of the previously described embodiments can employ a guide block 342 including a reversible channel block 344. With additional reference to FIG. 19, guide block 342 is similar to any of previously described guide blocks 42, 142 and 242, with the exception that guide channels formed therein include a fixed guide channel 346 and a space adjacent thereto for receiving a reversible guide block 344. Reversible guide block 344 includes a guide channel 348 offset to one side of reversible channel block 344. With specific reference to FIG. 20, it can be seen that when reversible channel block 344 inserted in one position, channel 346 and channel 348 are further apart than if reversible channel block 344 is reversed. This allows a single guide block to have more than one pocket hole pattern. Additionally, as can be seen in FIG. 21, multiple reversible channel blocks 344 can be provided having different sized guide holes, to provide for different size drills to be used.

Figure 22:
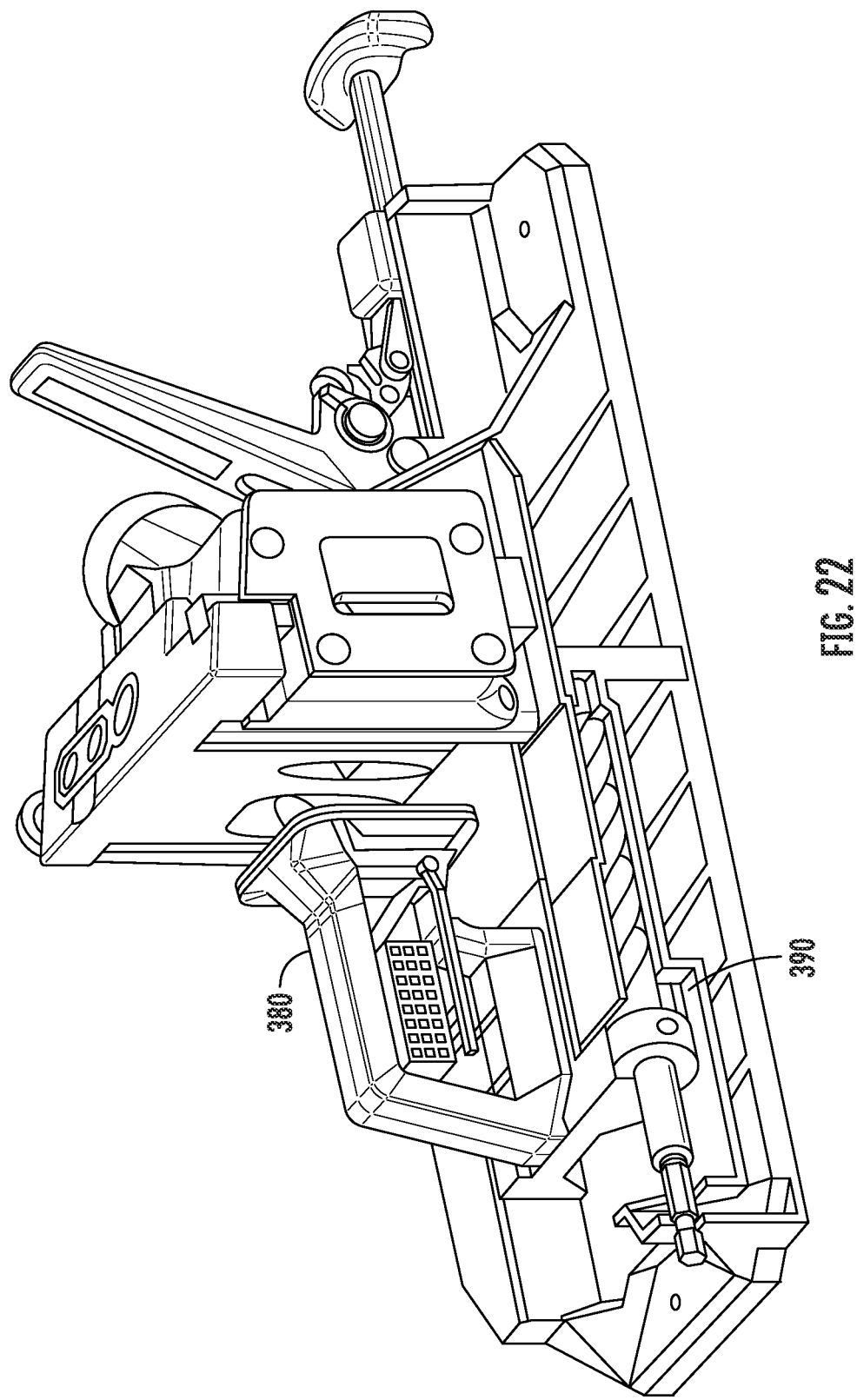
FIG. 22 is a perspective view of an auto-adjusting pocket hole jig docking station according to the present invention carried by a pocket hole jig base having a clamping mechanism and horizontal drill adjustment mechanism.

Turning now to FIG. 22, an auto-adjusting pocket hole jig docking station 310 carried by a pocket hole jig base 340 having a clamping mechanism 360 and horizontal drill adjustment mechanism 390 as disclosed in U.S. Pat. No. 10,376,967 herein incorporated by reference.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same,

The invention claimed is:

1. An auto-adjusting pocket hole jig docking station, comprising:
a housing;
an adjustment mechanism carried by the housing, the adjustment mechanism comprising:
a first rack reciprocally movable between a raised position and a lowered position, relative a body;
a second rack reciprocally movable between a raised position and a lowered position, relative the body; and
a double pinion gear carried rotatably by the housing, the double pinion gear including a first gear in meshing engagement with the first rack and a second gear in meshing engagement with the second rack, the first gear and the second gear of the double pinion gear having a rotational ratio therebetween;
wherein movement of one of the first rack and the second rack moves the other of the first rack and the second rack a distance proportional to the rotational ratio; and
an attachment fixture removably attaching a guide block to the housing.

2. The auto-adjusting pocket hole jig docking station as claimed in claim 1 wherein the attachment fixture includes coupling members attached between the housing and the guide block.

3. The auto-adjusting pocket hole jig docking station as claimed in claim 1 wherein the housing includes a housing body, and a cover portion received by the housing body, the second rack received between the housing body and the cover portion and including screw sizing indicia visible through a window formed in the cover portion.

4. The auto-adjusting pocket hole jig docking station as claimed in claim 1 further including a drill stop collar positioning system, comprising a collar receiver fixed to the second rack for receiving a stop collar therein through which a base end of a drill bit extends, wherein the collar receiver moves with movement of the second rack relative the drill bit to position the collar receiver therealong.

5. An auto-adjusting pocket hole jig docking station, comprising:
a housing;
an adjustment mechanism carried by the housing, the adjustment mechanism comprising:
a first rack reciprocally movable between a raised position and a lowered position, relative a body;
a second rack reciprocally movable between a raised position and a lowered position, relative the body; and
a double pinion gear carried rotatably by the housing, the double pinion gear including a first gear in meshing engagement with the first rack and a second gear in meshing engagement with the second rack, the first gear and the second gear of the double pinion gear having a rotational ratio therebetween;
wherein movement of one of the first rack and the second rack moves the other of the first rack and the second rack a distance proportional to the rotational ratio; and
a depth stop member coupled to the body and movable between a retracted position and an extended position in response to movement of the first rack.

6. An auto-adjusting pocket hole jig docking station, comprising:
a housing including a housing body, and a cover portion received by the housing body;
an adjustment mechanism reciprocally carried by the housing, the adjustment mechanism including a guide block gear rack and a plunger gear rack moveable between a raised position and a lowered position;
the plunger gear rack carried by the body and reciprocally movable between the raised position and the lowered position, relative the body as controlled by the thickness of a workpiece;
the guide block gear rack carried by the body and reciprocally movable between the raised position and the lowered position, relative the body; and
a double pinion gear rotatably carried by the housing, the double pinion gear including a first gear in meshing engagement with the plunger gear rack and a second gear in meshing engagement with the guide block gear rack, the first gear and the second gear of the double pinion gear having a rotational ratio therebetween;
wherein movement of the plunger gear rack moves the guide block gear rack a distance proportional to the rotational ratio; and
a depth stop member coupled to the body and movable between a retracted position and an extended position in response to movement of the guide block gear rack.

7. The auto-adjusting pocket hole jig docking station as claimed in claim 6 wherein the attachment fixture includes coupling members attached between the housing and the guide block.

8. The auto-adjusting pocket hole jig docking station as claimed in claim 7 wherein the depth stop member is reciprocally carried by the guide block and coupled to the body by the guide block gear rack, movement of the guide block gear rack results in a corresponding movement of the depth stop member.

9. The auto-adjusting pocket hole jig docking station as claimed in claim 6 wherein the housing includes the housing body, and the cover portion received by the housing body, the plunger gear rack received between the housing body and the cover portion and including screw sizing indicia visible through a window formed in the cover portion.

10. The auto-adjusting pocket hole jig docking station as claimed in claim 6 further including a drill stop collar positioning system, comprising a collar receiver fixed to the plunger gear rack for receiving a stop collar therein through which a base end of a drill bit extends, wherein the collar receiver moves with movement of the plunger gear rack relative the drill bit to position the collar receiver therealong.

\* \* \* \* \*